(12) United States Patent
Green et al.

(10) Patent No.: US 7,647,199 B2
(45) Date of Patent: Jan. 12, 2010

(54) METHOD FOR DETERMINING POSITIONS OF POINTS TO BE MEASURED

(75) Inventors: Alastair Green, Rebstein (CH); Jürgen Mayer, Dornbirn (AT); Matthew Gerard Desmond, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 82 days.

(21) Appl. No.: 11/948,751

(22) Filed: Nov. 30, 2007

(65) Prior Publication Data

US 2009/0082992 A1    Mar. 26, 2009

(30) Foreign Application Priority Data

Sep. 24, 2007    (EP) ................... 07117079

(51) Int. Cl.
*G01C 9/00* (2006.01)

(52) U.S. Cl. ..................................... 702/150

(58) Field of Classification Search ............ 702/150, 702/14; 356/611, 614, 139.03, 139.04; 701/208, 701/216

See application file for complete search history.

(56) References Cited

U.S. PATENT DOCUMENTS

| | | | | |
|---|---|---|---|---|
| 5,396,331 A | * | 3/1995 | Kitoh et al. ................. | 356/611 |
| 5,739,785 A | * | 4/1998 | Allison et al. ............ | 342/357.02 |
| 6,381,536 B1 | * | 4/2002 | Satoh et al. ................. | 701/208 |
| 6,732,051 B1 | * | 5/2004 | Kirk et al. ................... | 701/216 |
| 7,023,537 B2 | * | 4/2006 | Labat et al. ............ | 356/139.04 |
| 7,199,872 B2 | * | 4/2007 | Van Cranenbroeck .. | 356/139.03 |
| 7,376,516 B2 | * | 5/2008 | Jones .......................... | 702/14 |
| 2004/0252313 A1 | * | 12/2004 | Labat et al. ................. | 356/614 |
| 2005/0057745 A1 | * | 3/2005 | Bontje .................... | 356/139.03 |
| 2007/0225937 A1 | * | 9/2007 | Spiesberger ................ | 702/150 |

* cited by examiner

*Primary Examiner*—Tung S Lau
*Assistant Examiner*—Xiuquin Sun
(74) *Attorney, Agent, or Firm*—Workman Nydegger

(57) ABSTRACT

A position determination method for a set of new points to be surveyed, using a geodetic device and reference points whose positions in an absolute coordinate system are known. The position determination is effected by referencing the new points relative to a set of reference points and measurement of the reference points and of the new points in a relative coordinate system for referencing by the geodetic device—relative measured quantities being registered. Furthermore, the new points and the reference points are updated by successive addition in each case of the measured new points and reference points to the set of new points and set of reference points, respectively, and updating the position determination of the new points taking into account all of the respective actual reference points is effected if a specified minimum coefficient of determination for the referencing is ensured by the actual set of reference points.

15 Claims, 3 Drawing Sheets

METHOD FOR DETERMINING POSITIONS OF POINTS TO BE MEASURED

BACKGROUND

The invention relates to a position determination method for points to be surveyed, comprising a geodetic device.

A multiplicity of measuring methods have been known since antiquity for recording properties of defined points in a measuring environment, in particular of data with spatial reference. The location of a measuring device in addition to any reference points present and direction, distance and angle to measuring points are recorded as standard spatial data. While in many applications the position of the geodetic measuring device is known and unknown positions are measured, there are, however, also applications in which some measuring points are known or are surveyed and hence serve as reference points but the location of the surveying device is unknown.

A generally known example of such surveying devices or geodetic devices is the theodolite or a total station. An overview of geodetic measuring apparatuses of the prior art appears in "Elektronische Entfernungs- und Richtungsmessung [Electronic distance and direction measurement]" by R. Joeckel and M. Stober, $4^{th}$ edition, Verlag Konrad Wittwer, Stuttgart 1999. Such devices have angle and distance measuring functions which permit a direction and distance determination to a selected target. The angle or distance magnitudes are determined in the internal reference system of the device and, if appropriate, have to be linked to an external reference system for an absolute position determination.

In principle, the position of the geodetic device itself, i.e. the station coordinates of the measuring device, or the position of new points to be surveyed as so-called free stationing, can be derived from measurements to known, fixed measuring points as reference points. This process is also designated as referencing of the measuring device position or of the new points relative to the measured reference points of known position.

For this purpose, the position of the known reference points relative to the stand point in a local coordinate system is first calculated. With the aid of the known coordinates of these reference points, if more than the necessary number of measurements are present, matched transformation parameters are calculated, from which the sought station coordinates or the sought coordinates of the new points can then be derived. The process can be illustrated by an example: distances and directions are measured to some surrounding points and the position of these points relative to the location, i.e. in a local coordinate system, is plotted on a transparent sheet. A map of the desired coordinate system is now placed underneath this sheet. This system may be the national coordinate system or the coordinate system of a specific construction product. Measured reference points are now also to be found on this map. The sheet is rotated and shifted until the sheet points agree as well as possible with the points drawn on the map, which can be effected algorithmically by fit calculation according to the least squares method. Thereafter, the position of the geodetic measuring device and the positions of the new points measured in relative terms can be read on the map. This principle is applied not graphically but analytically, it always being necessary for the point number of a measuring point and the measured values from the geodetic device to this measuring point to be known and assigned.

The software for the calculations required for this purpose is integrated into most modern total stations or tacheometers. However, this still means that measurement of all reference points and derivation of a transformation relationship between device-related and absolute coordinate system must first be effected and only thereafter is it possible to start the measurement of new points actually to be surveyed. The minimum number of initially measured reference points which is required for such referencing is dependent on the surveying situation and on the relative measured quantities registered during the measurement, for example distance and direction from the geodetic device to the reference points. In practice, however, measurements over and above this to further known reference points are carried out where possible in order to obtain data on the reliability of the results, i.e. coefficient of determination, by agreement.

Algorithms by means of which overdetermined referencing of new points—for example referencing relative to more than two measured fixed points—is effected may be, for example, similarity transformations in combination with an averaging fit which is also referred to in the technical literature as Helmert transformation.

The erection of a total station and the determination of the actual station coordinates from known measuring points are generally tailored to the trained surveying engineer with regard to user guidance. The user must reliably identify in the field the reference points used for calculating the station coordinates and must assign to said reference points the correct point numbers which produce the linkage to the position of the reference point. After all known reference points were surveyed, the fitted relationship can then be derived and hence the absolute device position determined—i.e. the geodetic device referenced with respect to the reference points. Only thereafter is it possible to start measurement and surveying of the new points actually to be surveyed, the absolute positions of new points being determined in each case on the basis of the determined absolute device position from relative quantities of new points measured thereby.

Position determination methods of the prior art are therefore based on the surveying of known reference points whose measured values are recorded or further processed before the beginning of measurements to new points actually to be surveyed, in order to reference the subsequently measured new points relative to the reference points by derivation of a transformation relationship between device-related and absolute coordinate system. This necessary sequence with the prior stationing of the geodetic device by measurement of the known reference points, the derivation of the transformation relationship being carried out therefrom once, and the subsequent surveying of the new points proves to be complicated, slows down the method and increases the susceptibility to errors since there is a danger that reference points and new points will be confused or measured in duplicate. If, for example, a reference point and a new point have spatial directions similar from the location of the geodetic device, in position determination methods of the prior art a measurement of all reference points of the set of reference points must nevertheless first be effected, after which it is necessary to swivel back to the new point then to be surveyed.

In methods of the prior art, too, the relationship between absolute and device-related reference system is always derived once and this is then used for absolute position determination of the geodetic device and for transformation of measured values determined in all subsequent measurements of new points. If, for example in the measurement of the reference points from the set of reference points, effected for stationing of the device, a reference point is incorrectly read in or is forgotten and/or the transformation relationship is incorrectly derived, all measured values determined to the new points in the measuring process are also incorrectly transformed into the external reference system.

SUMMARY OF THE INVENTION

An object of the present invention is therefore to provide an improved and simplified position determination method for new points to be surveyed with a geodetic device.

A further object of the present invention is to reduce the susceptibility to errors and the time required for position determination and to increase the convenience for the user.

These objects are achieved by realizing the method features of the independent claim. Features which further develop the invention in an alternative or advantageous manner are described in the dependent patent claims.

The position determination method according to the invention departs from the sequence in which, before the actual surveying process of new points to be surveyed, all reference points of known position which are required for the derivation of a transformation relationship between an absolute and a device-related coordinate system first have to be measured, which sequence is required in methods of the prior art for stationing of a geodetic device.

In the method according to the invention, referencing known from the prior art of new points to be surveyed relative to reference points whose positions are known in an absolute coordinate system is effected. For this referencing of the new points relative to the reference points, measurement of these points via a geodetic device erected freely in the terrain is effected. According to the invention, on measurement of a reference point, said reference point is added to a set of reference points and, on measurement of a new point, said new point is added to a set of new points, so that the sets are each gradually extended and all measured points are also provided at later times in these sets. Furthermore, updating of the position determination of the new points effected by referencing is carried out, for which purpose in each case all reference points of the actual, extended set of reference points and hence all already measured reference points are taken into account. Thus, absolute positions of all already measured new points of the set of new points can be determined retroactively again and if appropriate updated with higher certainty in the absolute coordinate system.

For example, very different new points whose absolute positions are to be determined can now be immediately sequentially measured by a total station as a geodetic device and the relative positions thereof in the internal, relative coordinate system relating to the total station can be determined thereby. In order that these measured relative positions relate to an external, absolute coordinate system, in each case measurement of one or more known reference points can now be effected, without observing a measurement sequence, before, between or after the sequential measurement of the new points. However, identification of the reference points and assignment of the relative measured quantities determined for these reference points by the geodetic device to the respective known absolute positions thereof are additionally required. Such and similar methods are also described in the European Patent Applications with the application numbers 07107973.5 and 07117079.9. As soon as referencing with a specified coefficient of determination is ensured in the course of the measurement, for example at least two advantageously located reference points are surveyed and are added to the set of reference points, an actual position determination of the already surveyed new points—which are provided in the set of new points—can now be effected by referencing of these new points relative to the reference points of the set of reference points. If, in the further working or measurement process, further known reference points are measured and in each case added to the set of reference points, the positions of all new points measured until then can be determined again and in particular with a higher coefficient of determination, retroactively and taking into account the subsequently added reference points too.

In particular, these steps can also each be effected automatically so that measurement of a reference point automatically triggers storage of the determined relative measured quantities in the set of reference points and also updating of the position determination of all already measured new points taking into account the stored actual set of reference points is immediately carried out automatically. Thus, gradually and automatically updated referencing of the new points on the basis of the respective actual set of reference points comprising the reference points which are of known position and have already been measured can be effected.

Identification and assignment of further relatively measured reference points to a position known in the absolute coordinate system can also be automatically effected. If, for example, a relationship between relative and absolute coordinate system is already known with a specified minimum coefficient of determination, the relative position thereof determined on measurement of a further reference point can be transformed on the basis of the previous relationship and then compared with all known absolute positions for reference points in question and assigned to that absolute position which is closest to the transformed relative position. Thereafter, this reference point too with assigned known absolute position can be added to the set of reference points and taken into account in an updated derivation of the transformation relationship.

According to the invention, a measurement sequence of reference and new points to be surveyed sequentially can be freely chosen by the user. For example, the measurement sequence could be specified for the sequential measurement of new and reference points on the basis of the spatial direction of the respective points from the geodetic device, for example from left to right or from bottom to top in the field of view. The sequence for the measurement would then therefore be dependent on azimuth or elevation angle of each of the new and reference points from the geodetic device. Confusion or unintentional duplicate measurement of points to be measured can thus be prevented. It is also possible for visual contact from a known reference point to the total station to be blocked and to become free only in the subsequent course of work, for example during building demolition works. This known reference point can then be subsequently surveyed and added to the set of reference points so that the subsequently added reference point is also taken into account in an update of the position determination of the new points, and the referencing can be effected with a higher coefficient of determination. The absolute positions of all new points of the set of new points can now be retroactively updated and an accuracy of the calculated absolute positions of the new points can be gradually improved by measurement of respective further reference points.

It is also possible to establish the measurement sequence for the measurement of in each case the new and reference points on the basis of the effort involved in operation of the device. Thus, in each case that reference or new point still to be surveyed could be measured next for which the least effort is involved for the measurement thereof taking into account the instantaneous adjustment and alignment of the geodetic device. In particular, the respective effort for the respective measurement of the reference and new points can be estimated by a user and the sequence then established so that the overall measurement process can be carried out in as short a time as possible and with as little overall effort as possible.

Specifically, generation of reference points by a repositionable GNSS unit is also possible, in each case, after repositioning of the GNSS unit, the position thereof in an absolute coordinate system being determined by GNSS position determination and thus being provided as a known position. For example, various new points could now be measured and added to the set of new points. In between or in the course thereof, in each case repositioning and relative measurement of the position of the GNSS unit as a reference point could be effected. By a repeated recording of further reference points generated in this manner, the position determination of the new points can be constantly updated and determined with increasing coefficient of determination.

For example, a total station or a theodolite can function as a geodetic device for the method described, it also being possible according to the invention, to determine the position of the geodetic device as a new point in the absolute coordinate system.

Known absolute position is to be understood as meaning the position which is known in an absolute or external coordinate system, such as, for example, a position on a building site map or position coordinates in the Earth's coordinate system. On the other hand, the device-related relative position is defined as a position in a device-related or relative coordinate system relative to the geodetic device.

BRIEF DESCRIPTION OF THE DRAWINGS

The method according to the invention is described in more detail below, purely by way of example, with reference to specific working examples shown schematically in the drawings, further advantages of the invention also being discussed. Specifically.

DETAILED DESCRIPTION OF THE DRAWINGS

Figure 1:
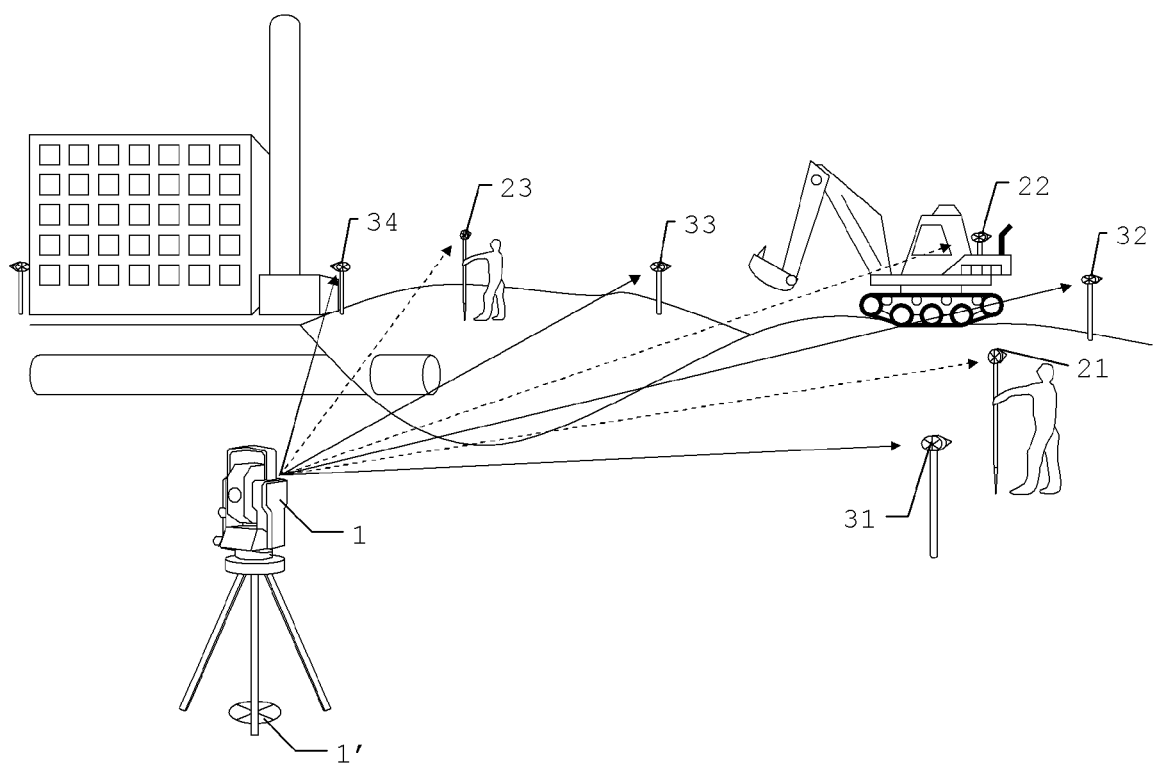
FIG. 1 shows the schematic diagram of a typical surveying situation in the building sector with new points to be surveyed and reference points of known position.

FIG. 1 shows a typical scenario in construction work, it being intended to determine absolute positions of new points 21, 22, 23 to be surveyed by means of a total station 1 as a geodetic device. The position determination of the new points 21, 22, 23 is effected by referencing thereof relative to reference points 31, 32, 33 and 34 having in each case a position known in an absolute coordinate system. For this purpose the reference points and the new points are each measured by the total station, relative measured quantities for the points—in particular distance and angle from the total station to each of the points—being registered. The relative measured quantities registered for the reference points can be assigned in each case to their known absolute position and a—in particular fitted—relationship between relative and absolute coordinate system can be derived therefrom. By means of this relationship, the relative measured quantities determined for the new points can be transformed from the relative into the absolute coordinate system and thus the absolute positions of the new points can be determined. According to the features of the method according to the invention, a sequence for the measurement in each case of the new and reference points can, as described, be freely chosen by a user of the total station. It is also possible to record successive further reference points to be taken into account for the position determination and in each case to carry out an actual position determination of the measured new points so that the relationship between relative and absolute coordinate system can be updated successively and with increasing coefficient of determination in the course of measurement by a recording of further reference points.

A first position determination of the already measured new points can be effected as soon as a specified minimum coefficient of determination is ensured by the reference points already measured and included in the set of reference points in the derivation of the relationship between relative and absolute coordinate system. Depending on requirements, measuring situation and position of the reference points, for example, 1, 2, 3 or even more reference points may be necessary for this purpose. If, in a measuring situation with new points freely distributed in space, the reference points lie roughly in a line from the geodetic device, the coefficient of determination for referencing the new points is only insignificantly increased by the inclusion of a further reference point which is located just as roughly on this line, it being possible for a person skilled in the art to design calculations for the certainty of the referencing and a minimum number for reference points to be taken into account therefor, depending on the measuring situation. If, for example, surveys are carried out along a railway rail laid along a known path, positions for new points along this track can be referenced with relatively high certainty relative to a measured reference point.

In the scenario described, a point of a working machine and two points of reflection prisms which are mounted on handheld surveying rods are determined as new points 21, 22, 23. Also erected in the terrain are reflection prisms of fixed position—the absolute position of which is known in each case—as the reference points 31, 32, 33, 34. The position 1' of the geodetic device 1 in an absolute coordinate system can additionally be determined as a further new point, the zero point of the relative, device-related coordinate system usually being specified as the relative position of the device 1.

A sequence for the measurement of the new and reference points can be determined as a function of the relative position of the new and reference points from the geodetic device—i.e. the position of the points in the field of view of the geodetic device. In particular, the sequence maybe based on azimuth angles of each of the new and reference points from the geodetic device—for example, from left to right in the field of view—or based on elevation angles of each of the new and reference points from the geodetic device—for example from bottom to top in the field of view.

Figure 2:
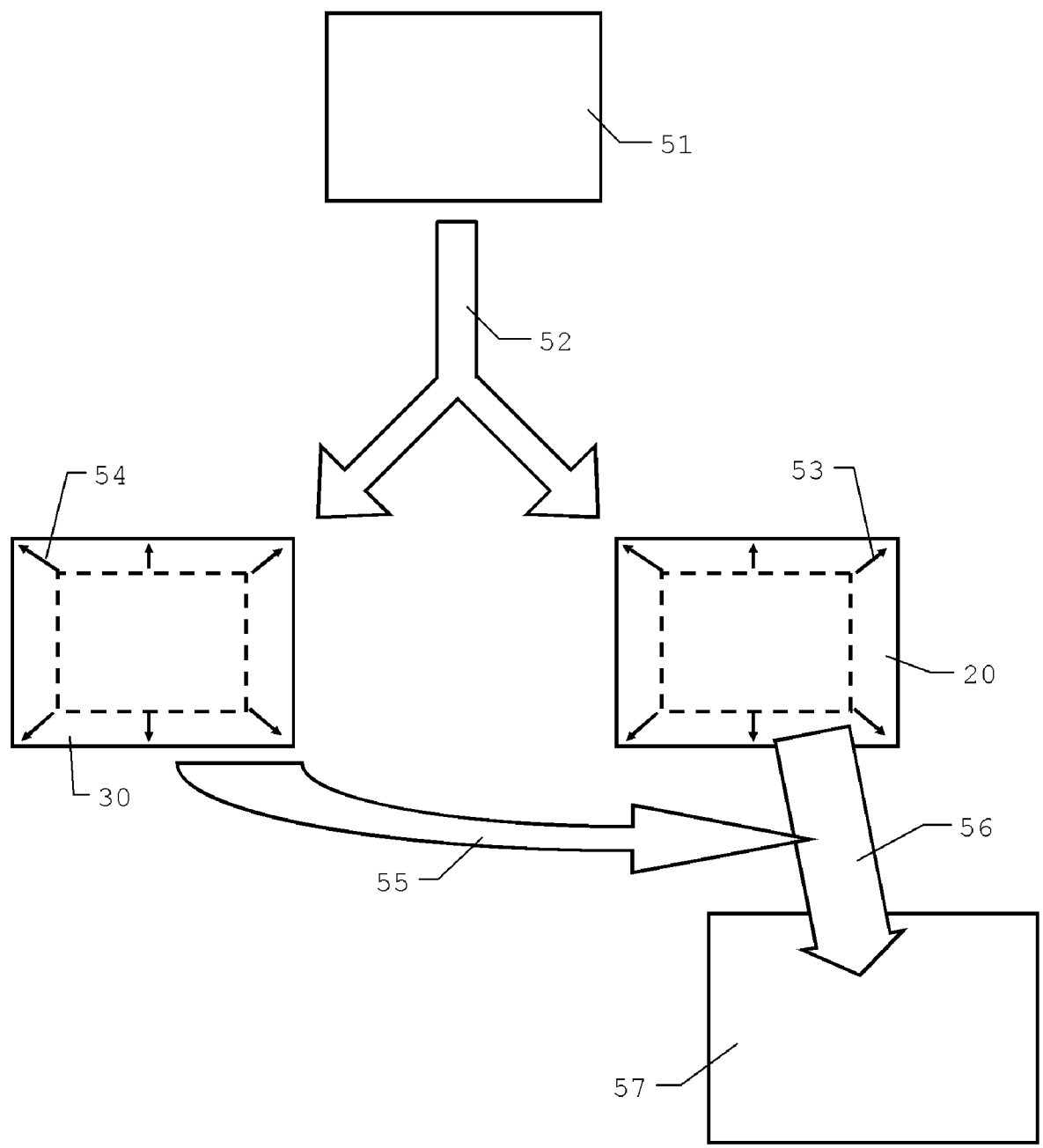
FIG. 2 shows a diagram for illustrating the position determination method according to the invention.

FIG. 2 shows an illustrated diagram of the steps of the position determination method according to the invention. The total set of the new and reference points to be surveyed is represented as first box 51, the reference points having known positions in the absolute coordinate system. The first arrow 52 embodies the measurement in each case of the new and reference points and the successive addition of the measured reference points and new points in each case to the set 30 of reference points and set 20 of new points, respectively. The addition results in each case in an extension and hence updating 53, 54 of the set 30 of reference points and of the set 20 of new points. The sets are shown in each case before the extension and updating as dashed sets and are extended in each case by the successive addition. The extension is represented in each case by the arrows from the set of reference points or new points shown with a dashed line to the updated set of reference points or new points shown with a solid line.

The second arrow 55 illustrates the taking into account of the respective actual set 30 of reference points, i.e. all reference points which have already been measured, for the updated position determination of the new points in the absolute coordinate system, shown as third arrow 56. The updating of the position determination—which is effected by referencing the new points stored in the set 20 of new points relative to the already measured reference points of the respective actual set 30 of reference points—can be triggered, for example, directly by the extension or updating of the set 30 of reference points, continuously at specified time intervals or by a user.

The set of the absolute positions of the new points in the absolute coordinate system, determined by the position determination, is shown as second box 57.

Figure 3A:
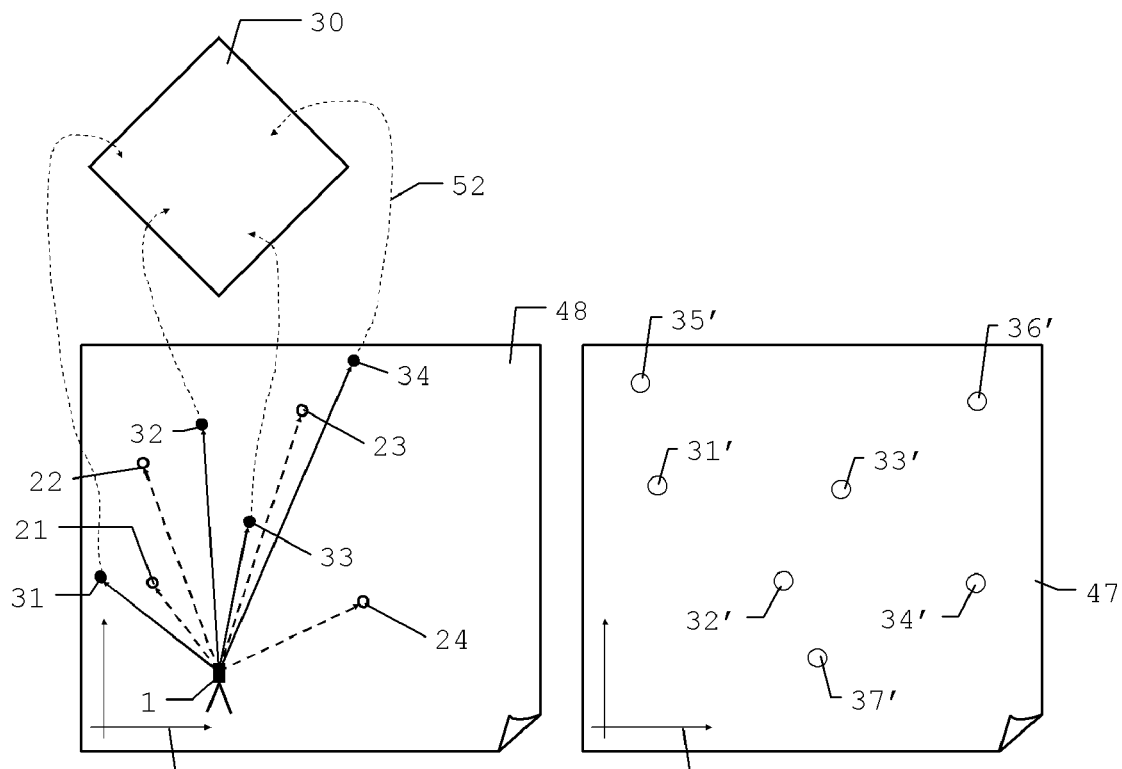
FIG. 3a-b show an exemplary graphic referencing of the new points on the basis of reference points which are of known position and have already been measured.
Figure 3B:
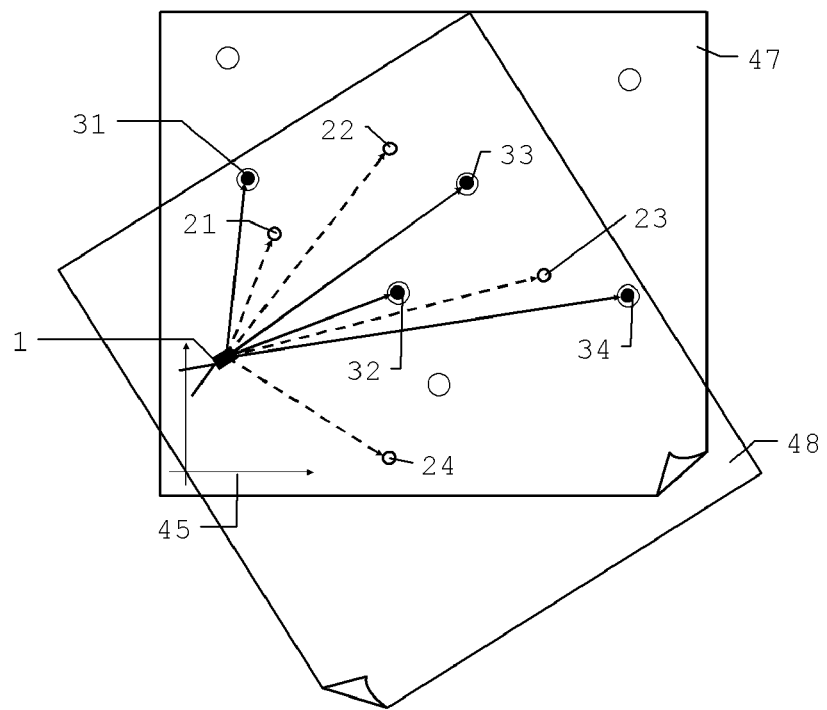

FIGS. 3*a* and 3*b* illustrate an exemplary graphic referencing of the new points 21, 22, 23, 24 of a set of new points on the basis of reference points 31, 32, 33, 34 of an actual set 30 of reference points, which reference points are of known position and have already been measured.

The positions 31', 32', 33', 34', 35', 36', 37' of reference points, known in an absolute coordinate system 45, are entered in a map 47.

By measurement of new and reference points by means of the geodetic device 1, this being effected with point type overlap, i.e. reference points are also measured between the sequential measurement of the new points, the positions of the points 1, 21, 22, 23, 24, 31, 32, 33, 34 determined in the relative, device-related coordinate system can be plotted on a transparent sheet 48.

The dashed arrows 52 represent the successive addition of a measured reference point to the set 30 of reference points in the respective measurement of the reference points 31, 32, 33, 34.

In this figurative representation of the referencing, the introduction or marking of this point on the transparent sheet 48 could also be considered as the addition of a further reference point or new point, so that in each case the actual set of reference points and the actual set of new points are provided on the transparent sheet.

The transparent sheet 48 is now shifted, rotated and stretched on the map 47 until the reference points 31, 32, 33, and 34 marked on the transparent sheet 48 show the best coincidence with the positions 31', 32', 33', 34' coordinated in each case with these on the map 47, which is shown in FIG. 3B*b*.

This method is now carried out not graphically with a transparent sheet but analytically or by means of image processing, addition of a further reference point to the transparent sheet 48 being followed by shifting again of the updated transparent sheet in such a way that the reference point markings on the transparent sheet show on average the best coincidence with the respective known absolute positions on the map 47.

Of course, these figures shown schematically represent only possible working examples. The various approaches can, according to the invention, be combined with one another and with methods of the prior art.

We claim:

1. A method for determining the position of a set of new points which are to be surveyed using a geodetic device where a set of reference points are installed on a surveying site and the positions of the reference points in an absolute coordinate system are known, the method comprising the following acts:

measuring the set of reference points and the set of new points in a relative coordinate system using the geodetic device where relative measurements of the set of reference points and the set of new points are determined;

determining absolute positions of the set of new points in the absolute coordinate system by referencing the set of new points relative to the set of the reference points;

updating the set of new points and the set of reference points in each case by:

successively adding additional measured new points to the set of new points; and successively adding additional measured reference points to the set of reference points, respectively; and updating the absolute positions of the entire set of new points including the successively added additional measured new points by taking into account the set of reference points including the successively added additional measured reference points.

2. The positions determination method as claimed in claim 1, wherein the measurement of the new points and of the reference points is carried out with point type overlap.

3. The position determination method as claimed in claim 1, wherein the updating the absolute positions is effected for all new points of the set of new points each time a measured point is successively added to the set of new points.

4. The position determination method as claimed in claim 1, wherein a position of the geodetic device in the absolute coordinate system is determined as a new point.

5. The position determination method as claimed in claim 1, wherein each updating of the set of reference points automatically triggers the act of updating of the absolute positions of the new points.

6. The position determination method as claimed in claim 1, wherein the updating of the position determination of the new points is triggered by a user.

7. The position determination method as claimed in claim 1, wherein the steps are effected at least partly automatically.

8. The position determination method as claimed in claim 1, wherein a sequence for the measurement of the new points and reference points by a relative position of the new points and reference points is determined from the geodetic device.

9. The position determination method as claimed in claim 8, wherein the sequence is based on azimuth angles of the new points and reference points and the sequence is determined from the geodetic device.

10. The position determination method as claimed in claim 8, wherein the sequence is based on elevation angles of the new points and the reference points and is determined from the geodetic device.

11. The position determination method as claimed in claim 8, wherein the sequence is based on elevation angles of the new points and the reference points and is determined from the geodetic device.

12. The position determination method as claimed in claim 1, wherein the effort involved in operating the geodetic device for the measurement of each of the new and the reference points for establishing a measuring series is taken into account in determining a sequence for measurement of the new points and the reference points.

13. The position determination method as claimed in claim 1, wherein the reference points are generated at least partly by a repositionable GNSS unit, the positions thereof in an absolute coordinate system being provided in each case by GNSS position determination as known positions.

14. The position determination method as claimed in claim 1, wherein the act of updating the absolute positions of the entire set of new points including the successively added additional measured new points is carried out by taking into account the entire set of reference points including the successively added additional measured reference points.

15. The position determination method as claimed in claim 1, wherein the geodetic device includes a total station or theodolite.

\* \* \* \* \*